(12) United States Patent
Mantock

(10) Patent No.: US 8,878,063 B2
(45) Date of Patent: Nov. 4, 2014

(54) CHARGE TRANSFER ZERO LOSS POWER AND SIGNAL TRANSMISSION CABLE

(76) Inventor: Paul L. Mantock, Middlesex (GB)

( * ) Notice: Subject to any disclaimer, the term of this patent is extended or adjusted under 35 U.S.C. 154(b) by 633 days.

(21) Appl. No.: 13/061,523

(22) PCT Filed: Sep. 3, 2009

(86) PCT No.: PCT/GB2009/002122
§ 371 (c)(1),
(2), (4) Date: Mar. 1, 2011

(87) PCT Pub. No.: WO2010/026380
PCT Pub. Date: Mar. 11, 2010

(65) Prior Publication Data
US 2011/0162872 A1 Jul. 7, 2011

(30) Foreign Application Priority Data
Sep. 4, 2008 (GB) .................. 0816106.9

(51) Int. Cl.
H01B 7/00 (2006.01)
H01B 7/30 (2006.01)
H01B 7/08 (2006.01)

(52) U.S. Cl.
CPC ... *H01B 7/30* (2013.01); *H01B 7/08* (2013.01)
USPC ................ 174/110 R; 174/117 R; 174/117 F; 174/117 FF

(58) Field of Classification Search
USPC ...... 174/110 R, 113 R, 117 R, 117 F, 117 FF, 174/36
See application file for complete search history.

(56) References Cited

U.S. PATENT DOCUMENTS

| | | | | |
|---|---|---|---|---|
| 3,818,122 A | * | 6/1974 | Luetzow | 174/86 |
| 3,878,341 A | * | 4/1975 | Balde | 307/113 |
| 3,968,321 A | * | 7/1976 | Olszewski et al. | 174/36 |
| 4,283,593 A | * | 8/1981 | Piasecki et al. | 174/36 |
| 4,934,956 A | * | 6/1990 | Conti | 439/492 |
| 6,184,469 B1 | * | 2/2001 | Conti | 174/72 TR |
| 6,538,205 B2 | * | 3/2003 | Ueno | 174/117 F |
| 6,723,925 B2 | * | 4/2004 | Ohara et al. | 174/113 R |

* cited by examiner

*Primary Examiner* — William H Mayo, III
(74) *Attorney, Agent, or Firm* — Fish & Tsang, LLP

(57) ABSTRACT

The layers of electric conducting material 18 formed into a charging folded closed loop 20 and a discharging folded closed loop 20 with the apex of the fold 22 of each folded closed loops in opposition to each other, being the ends of the cable, are separated from each other by a dielectric material 19, thereby making capacitive contact and creating opposing electric fields for each cycle of the alternating current, thereby transmitting an alternating current at constant voltage from a power supply to a point of transmission.

8 Claims, 3 Drawing Sheets

CHARGE TRANSFER ZERO LOSS POWER AND SIGNAL TRANSMISSION CABLE

FIELD OF THE INVENTION

The field of the invention is transmission of electrical energy along a conductor.

When electric energy is transmitted over a conductor it loses energy as heat due to the resistance of the conductor and produces an electromagnetic field. Therefore no matter for what purpose when electric energy is transmitted along a conductor, whether for signalling or to supply electric energy from one point at another, as the conductor length increases, the energy losses increases. To limit the power losses due to heat the power being transmitted the voltage is stepped up by a transformer to reduce the transmitted current thereby reducing heat losses. Stepping up the voltage, increases electromagnetic radiation, this can be harmful and is associated with leukemia in children.

Super conductors have been developed to reduce these losses, but superconductivity requires supplementary equipment to providing the necessary cooling to make a super conductor super conductive. This cooling requires energy and because of the bulk of this cooling equipment limit's the use of superconductors. Super conductors and its necessary supplementary equipment is expensive, therefore its use limited to where it is economically viable.

BACKGROUND

The capacitor-compensated cable U.S. Pat. No. 4,204,129. Loren H. Hutchins Jr. with Capacitance-compensated Cable has attempted to use capacitance to reduce transmission power losses. This seems to be based on the long and well established fixed series capacitance-compensation system, where the impedance long distance power lines are reduced, which reduces power loss by the use of capacitors in series with the power line. However, because of the susceptibility of conventional capacitors to overvoltage, the capacitors in such systems need to be protected by shunt circuits to limit the voltage across the capacitors.

SUMMARY OF THE INVENTION

The capacitance-compensated cable is basically a conventional linear capacitor and if it is to perform as calculated, the charge has to be evenly distributed between the capacitively linked conductors along their entire lengths; in addition, the charge has to be transferred from one conductor to the next, uniformly along their entire lengths. This will not happen because it is well known in the capacitor field, that all conventional capacitors when charged, concentrates the charge at the electrode ends and the electrodes of the conventional capacitor has to be designed to minimize this effect and even when it is used in series in power applications it has to have shunt circuitry for protection.

The inventor, realizing this, has attempted to design out these problems by varying the area of cross-section of the two capacitively linked conductors of the capacitance-compensated cable. This does not evenly distribute charge along their lengths; it causes charge concentration at the end of the conductor connected to the power supply, due to its pointed end. With no circuit protection concentrated charge will increase the localized potential difference between the conductors, causing the concentrated charge to discharge at a catastrophic rate, very likely by arcing, generate localized intense heat and irreversibly damaging the dielectric material of the cable. If the capacitance-compensated cable is to work properly it has to have shunt protection along its entire length. This will require an additional length of cable be provided for each phase of the capacitor-compensated cable for the shunt circuitry and with complexity of design makes its manufacture, installation and maintenance makes the capacitance-compensated cable costly and does not offer any improvement over existing technologies.

The invention is A Charge Transfer Zero Loss Power and Signal Transmission Cable (charge transfer cable) comprising two folded closed continuous electrical loops (folded loops). And each folded loop is comprised of an electric conducting material being formed into a closed continuous electrical loop by being folded into two half loops.

The outer perimeter of the two half loops are insulated from each other by a dielectric material, as means to prevent any electric contact when the two half loops are folded. The inner perimeter of each folded is provided with a dielectric material to prevent any electrical contact of the inner perimeter.

Each half loop of each folded loop is the length of the charge transfer cable. One of the folded loops is a charging loop and the other is a discharging loop. The apex of the fold of each of the two folded loops is the ends of the transmission cable, and each apex is provided with connectors to connect the charging and discharging folded loops to a power supply and a point of electric power transmission respectively.

The two half loops of one of the folded loops is arranged in alignment inside the other two half loops. The two half loops are separated from each other by a dielectric material so that the outer surfaces of the inner folded loop only makes capacitive contact with the inner surface of the outer folded loop.

Alternatively, the charging and discharging folded loops are arranged side by side so that the edges of each layer of electric conducting material of the charging and discharging folded loops are in alignment with each other, but separated by an appropriate gap. This is to ensure that the folded loops are not in electrical contact with each other, but sufficiently close to utilize the generated electric field of the charge, usually associated with the corona of a capacitor. The apex of the fold of each of the two folded loops are the ends of the charge transfer cable, and are provided with connectors to connect the charging and discharging folded loops to a power supply and a point of electric power transmission respectively. In this manner the charging folded loop is discharged to the discharging folded loop by induction. In this case, because the charge is not transferred through the dielectric material, but by the electric field, this configuration can transmit electric energy in the form direct current as well as alternating current at a constant voltage.

The arrangement of the charging and discharging folded loops causes the alternating current of each half cycle of charging alternating current, or the direct current charging the charging folded loops of the cable, to have opposing alternating current flow. This induces opposing electrical fields, which perhaps creates a neutral zone or neutral zones in the structure of the electric conducting material, so that the charging electrons can flow unimpeded with no resistance, thereby charging the dielectric of the charging folded loop. The charge is then transferred through the dielectric material, or the gap separating the charging and discharging folded loops, to the discharging folded loop. Here, again, this causes the discharging alternating current or direct current to have opposing alternating current flow, inducing opposing electric fields, creating a neutral zone or neutral zones in the structure of the electric conducting material, so that the discharging electrons can flow unimpeded with no resistance.

The size of the zone or zones and the amount of electrons flowing through the zone or zones are directly related to the capacitance of the charge transfer cable, the transmission direct voltage or alternating voltage, and the frequency of the transmission voltage. The charge transfer cable transmits electric energy in the form of a pure capacitive charge, along its length, as a zero loss alternating or direct current at constant voltage. When transmitting electric energy as an alternating current, the current is directly related to the transmission alternating voltage, its frequency and its capacitance. When transmitting electric energy as a direct current, the current is directly related to its voltage and capacitance. Thereby the power being transmitted is zero loss through the said charge transfer zero loss power and signal transmission cable.

BRIEF DESCRIPTION OF THE DRAWINGS

The Charge Transfer Zero Loss Power and Signal Transmission Cable is explained with the following drawings.

DETAILED DESCRIPTION

Figure 1:
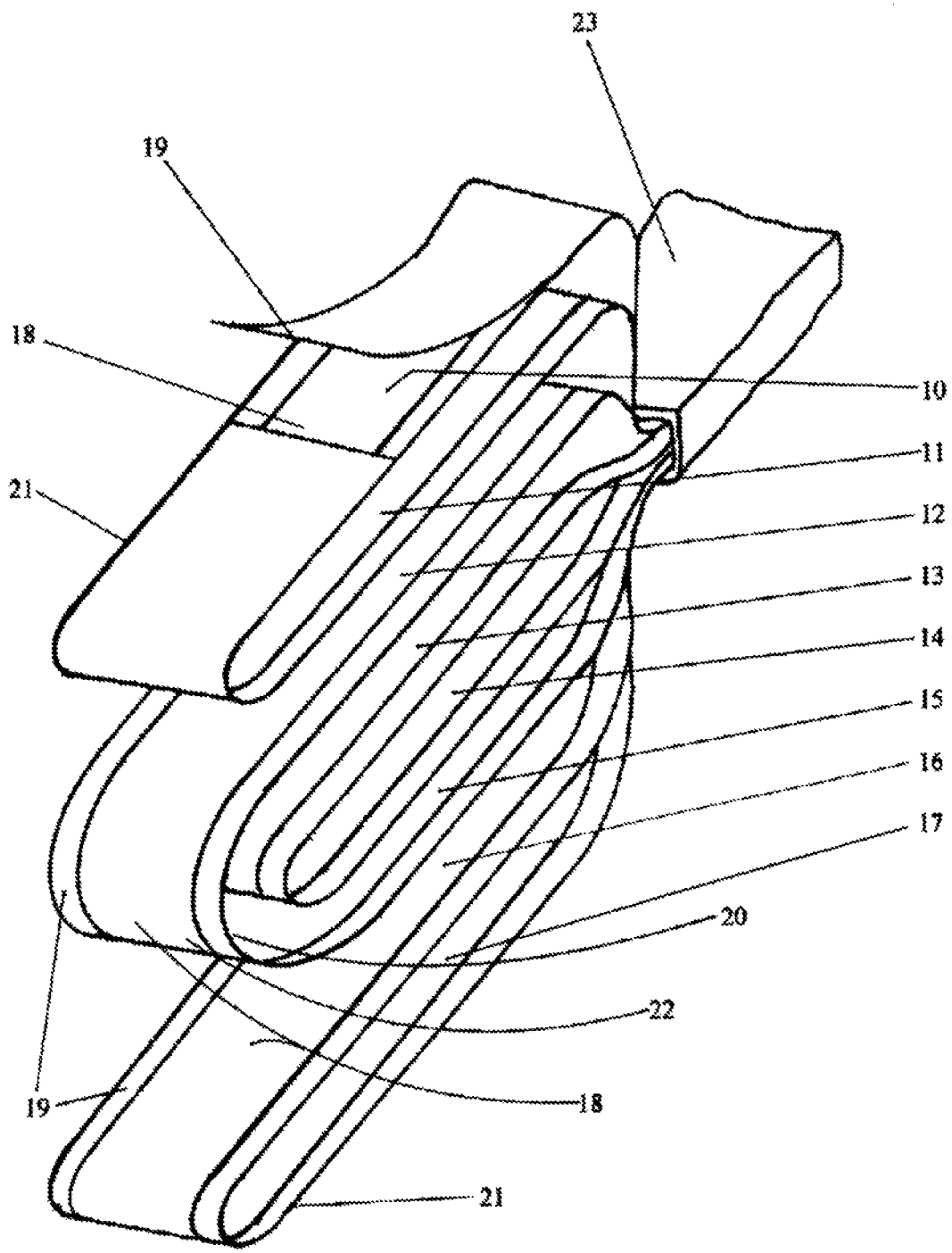
FIG. 1 shows in perspective an end section of the charge transfer cable, with the layers of conducting and dielectric materials separated to show their arrangement to form the one end of each of the folded closed continuous electrical loops.

From FIG. 1, eight lengths of an electric conducting material 18 are layered in alignment, one on top of the other. The lengths are secured together by compression, by an adhesive. Each layer of electric conducting material can be electrically joined to give a cable of any length. Each of the layers of the electric conducting material 18 is separated from each other by alternate layers of a dielectric material 19 of required dielectric constant, including the surfaces of the outer layers of the electric conducting material 18. At one end of the eight layers of electric conducting material 18, the said eight layers are numbered 10, 11, 12, 13, 14, 15, 16 and 17 respectively, as in FIG. 1, FIG. 2 and FIG. 3.

Figure 2:
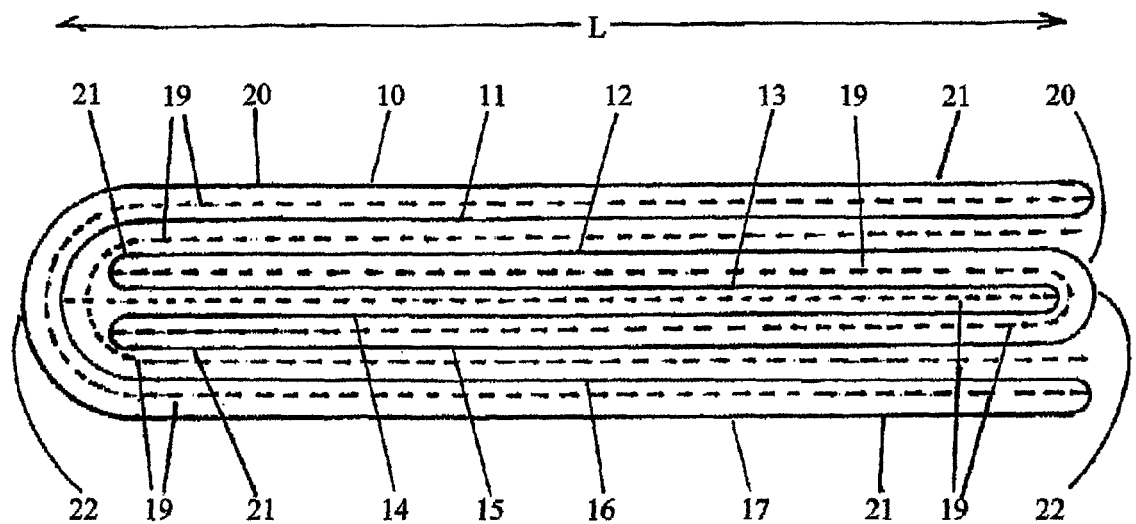
FIG. 2 shows a side view of the cable with the layers of electric conducting materials arranged for the first embodiment of the invention.

In the first embodiment of the invention, as shown in FIG. 2, at one end of the charge transfer cable, the ends of the eight layers of electric conducting material 18, numbered 10 to 17 are arranged in pairs of 10 and 17, 11 and 16, 12 and 13, and 14 and 15, and are electrically joined. At the other end, the ends of the eight layers of electric conducting material 18, the eight layers are arranged in pairs of 10 and 11, 12 and 15, 13 and 14, and 16 and 17, and are electrically joined forming two folded closed continuous electrical loops 20. One of the loops is inside the other in alignment with layers of electric conducting materials 11 and 12 and 15 and 16 of the folded half loops 21 of each folded closed continuous electrical loop 20. These are separated by dielectric material 19, making capacitive contact with 2 areas of electric conducting material 18 and dielectric material 19.

Figure 3:
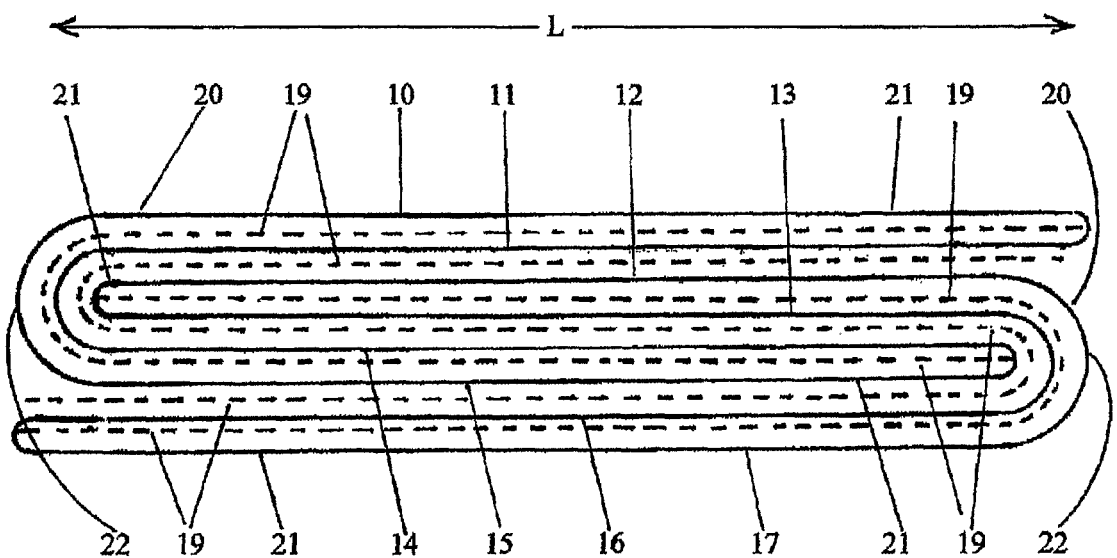
FIG. 3 shows a side view of the cable with the layers of electric conducting materials arranged for the second embodiment of the invention.

In the second embodiment of the invention, as shown in FIG. 3, at one end of the charge transfer cable, the ends of the eight layers of electric conducting material 18, numbered 10 to 17 are arranged in pairs of 10 and 15, 11 and 14, 12 and 13, and 16 and 17, are electrically joined. At the other end, the ends of the eight layers of electric conducing material 18, are arranged in pairs of 10 and 11, 12 and 17, 13 and 16, and 14 and 15, and are electrically joined forming two folded closed continuous electrical loops 20. Each of the half loops 21 are arranged alternately one inside the other, in alignment with layers of electric conducting materials 11 and 12, 13 and 14, and 15 and 16 of the folded half loops 21. Each of the half loops 21 is separated by dielectric material 19, making capacitive contact with 3 areas of electric conducting material 18 and dielectric material 19.

Figure 4:
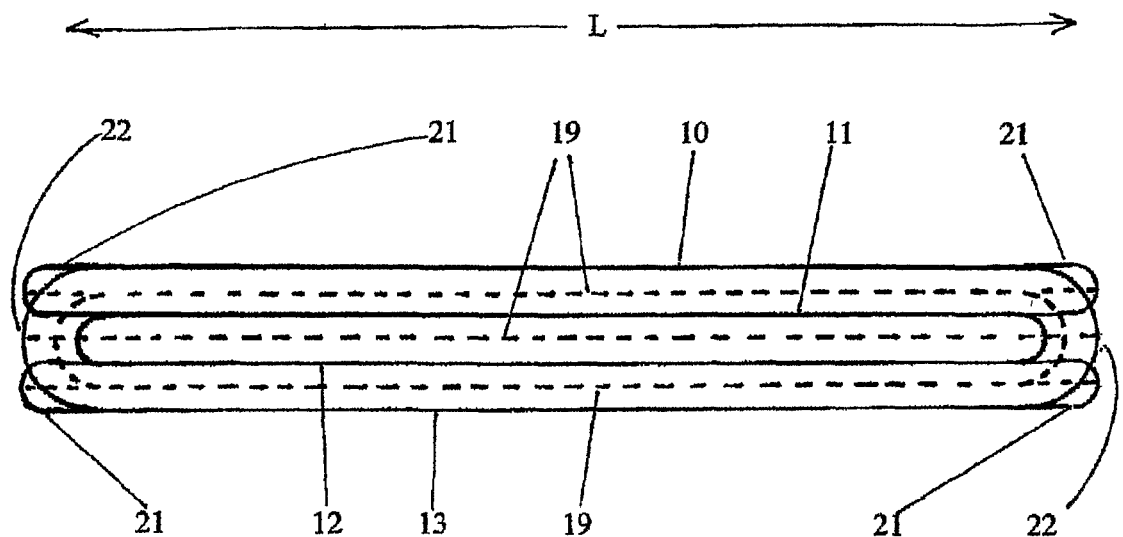
FIG. 4 shows a side view of the side by side arrangement of the folded closed continuous electric loops forming the third embodiment of the invention.
Figure 5:
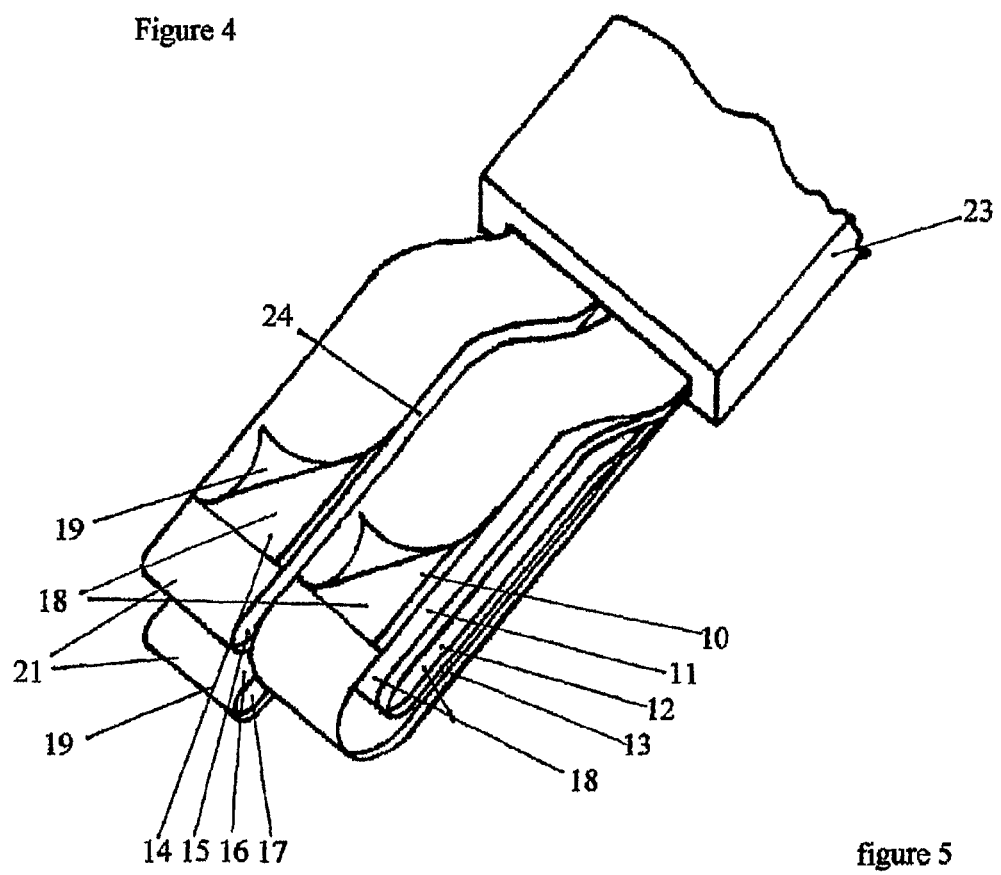
FIG. 5 shows in perspective an end section of the side by side arrangement of the charge transfer cable, with the layers of electric conducting and dielectric materials separated to show their arrangement to form one end of each of the folded closed continuous electrical loops.

In the third embodiment of the invention, as shown in FIG. 4 and FIG. 5, the charge transfer cable comprises one pair of 4 layers of electric conducting materials 18, laid with edges in alignment side by side separated by a gap 24. Each layer of the pair of electric conducting material 18 is separated by a common dielectric material 19, with the layers secured together by compression, by an adhesive. Each layer of the pair of electric conducting material 19 is numbered 10, 11, 12 and 13, 14 and 15, and 16, and 17 respectively. At one end of the cable, the layers of electric conducting material 18 numbered 10 to 13, and 14 to 17, are arranged in pairs of 10 and 13, 11 and 12, 14 and 15, and 16 and 17, and are electrically joined. At the other end of the charge transfer cable, the layers of electric conducting materials 18 10 to 13, and 14 to 17, are arranged in pairs of 10 and 11, 12 and 13, 14 and 17, and 15 and 16, and are electrically joined. This forms two side by side, folded closed continuous electrical loops 20, with the ends of each folded loop 20 in alignment, separated by a gap 24.

In all three embodiments of the invention, the apex of the fold 22 of each of the two folded loops 20 are provided with connectors (not shown), with one of the folded loops 20 being the charging folded loop and the other of the folded loops 20 being the discharging folded loop. When the charging folded loop 20 is connected to a power supply, and the discharging folded loop 20 is connected to a point of electric power transmission, the current at a constant voltage from the power supply flows in opposition in the half folds 21 of the charging loop 20, causing an opposing electric field. This creates a neutral zone or neutral zones in the structure of the electric conducting material 18, so that the charging electrons can flow unimpeded with no resistance, charging the charging loop 20.

When charged, the charge from the charging loop 20 is transferred to the discharging loop 20 through the dielectric material 19 in the cases of embodiments 1 and 2 of the invention. In the case of the third embodiment of the invention, the charge from the charging loop 20 is transferred across the gap 24 by means of the electric field at the edges of the electric conducting material 18. The charge in the discharging loop 20 causes an opposing field in the half folds 21 of the discharging loops 20, when the charge is being discharged as a current to the load, creating a neutral zone or neutral zones in the structure of the electric conducting material 18. The result is that the discharging electrons can flow unimpeded with no resistance, resulting in electric power being transmitted through the charge transfer cable with zero power loss at a constant voltage.

The folded loops are enclosed with a layer of dielectric material (not shown), which is in turn enclosed by a layer of an electric conducting material (not shown) as charge containment. All of that is enclosed in suitable protective covering 23 to protect the charging and discharging loops from the environment in which the folded loops will operate. The covering can include an electric conducting material (not shown) to protect the folded loops from electric interference, and the electric conducing material can be connected to earth, to conduct to earth any induced currents due lightening discharge, preventing power surges. The size of the zone or zones of the electric conducting material of the charge transfer cable, and the amount of electrons flowing through the zone or zones, and hence the amount of current transmitted through the charge transfer cable as an alternating current I amps, is directly related in the following way, $$I=2\pi fCV$$

where I amps=the transmitted current, f hertz=the frequency of the alternating current of the power supply, V volts=the supply voltage and C farads=the capacitance of the zero power loss AC power and signal transmission cable.

The capacitance C farads is related to the dimensions of the electric conducing material and the dielectric material for each embodiment of the invention in the following way:

The First Embodiment $$C=KoKW2L/d \text{ farads}$$

and
  W=the width of each layer of the electric conducting material (FIG. 1)
  L=length of cable (FIGS. 2, 3 and 4)
  d=thickness of the dielectric material
  K=dielectric constant
  Ko=permittivity of a vacuum The Second Embodiment $$C=KoKW3L/d \text{ farads}$$

The Third Embodiment $$C=KoKW2L/d \text{ farads}$$

With the third embodiment, the size of the zone or zones of the electric conducting material of the charge transfer cable, and the amount of electrons flowing through the zone or zones, and hence the amount of current transmitted through the charge cable as a direct current I amps, is directly related in the following way, $$I=CV/t$$

where t is time taken for the charge to be transmitted from the power supply to the load. The charge transfer zero loss power and signal transmission cable transmits electric energy in the form of a pure capacitive charge, along its length per cycle, as electric power, that is directly related to transmission alternating voltage and current I amps in the following way:

$$P=IV=2\pi fCV^2$$

where:
  P=transmission power (watts)
  V=transmission AC voltage (volts)
  f=frequency of transmission voltage (hertz)

The charge transfer cable transmits electric energy in the form of a pure capacitive charge, along its length, as electric power, that is directly related to transmission direct voltage and current I amps in the following way:

$$P=IV=CV^2/t$$

The relationships of alternating current and power have no resistance or inductance functions, therefore the power being transmitted has zero power loss through the cable, and there will zero or negligible electromagnetic radiation. In addition as the transmission distance increases, the length L of the cable increases, and for a constant width of electric conducting material 18, the capacitance of the charge transfer cable will increase, since the capacitance C farads is:

$$C=KoKW2L/d \text{ farads, for the first and third embodiments}$$

and $$C=KoKW3L/d \text{ farads, for the second embodiment.}$$

and $$P=2\pi fCV^2 \text{ watts for alternating current}$$

$$P=IV=CV^2/t \text{ for direct current}$$

Therefore as the transmission distance increases, the more power the charge transfer cable can transmit, making it possible to transmit more power over much greater distances without any power loss.

The invention claimed is:

1. A cable comprising:
   a charging folded, continuous, electrical loop;
   a discharging folded, continuous, electrical loop;
   the changing and discharging loops separated by, and making capacitive contact with, each other through at least one dielectric material;
   the charging and discharging loops positioned adjacent one another such that opposing electrical fields induced by current running through the charging and discharging loops creates a neutral zone that reduces resistance to a flow of electrons through the cable.

2. The cable of claim 1, further comprising:
   the charging loop operatively coupled to a power supply in a manner that alternately directs a charging electric current in opposite directions;
   the discharging loop operatively coupled to a point of an electric power transmission in a manner that alternatively directs a discharging electric current in the opposite directions, thereby creating an electric field that is discharged to a load, and such that the loop transmits electric power from the power supply to the point of transmission; and
   at least one protective layer that protects the charging and discharging loops in an operating environment.

3. The cable of claim 1, wherein the protective covering includes at least one layer of a second dielectric material disposed on a grounded electric conducting material as an electric charge containment.

4. A system, comprising:
   at least two folded closed continuous electrical loops;
   one of the said two loops being a charging loop provided with a first connector as means to connect the charging loop to a power supply;
   the other of the two folded electrical loops being a discharging folded electrical loop provided with a second connector as means to connected the discharging loop to a point of electric power transmission;
   wherein the charging and discharging loops are arranged side by side and in alignment with each other, are separated by a gap;
   wherein the charging loop is disposed to direct a charging electric current in a first direction, and then in an opposing second direction, thereby creating an opposing electric field;

wherein the dielectric material is positioned to transfer charge from the charging loop through the gap to the discharging loop;

wherein the discharging loop is positioned to direct a discharging electric current in the first direction, and then in the opposing second, direction, thereby creating an opposing electric field, such that the loops creates a neutral zone that reduces resistance in the system when transmitting electric power from a power supply to a point of electric power transmission; and wherein the charging and discharging loops are enclosed with at least one protective layer that contains the electric charges, and thereby protects the charging and discharging loops in their operational environment.

5. A linear capacitor adapted to capacitance-compensate a transmission cable, comprising:

a closed, continuous electrical loop comprising a plurality of layers of an electric conducting material folded into at least two half loops;

the at least two half loops positioned adjacent one another such that opposing electrical fields induced by current running through the at least two half loops creates a neutral zone that reduces resistance to a flow of electrons in the cable; and a first dielectric material disposed on an outer perimeter of the at least two half loops, respectively, and a second dielectric material disposed on an inner perimeter of the at least two half loops, respectively, such that the at least two half loops are electrically insulated from each other.

6. The linear capacitor of claim 5, wherein the loop is coupled to a circuit that produces, in the loop, charging and discharging currents that flow in opposite directions, thereby creating an opposing electric field, and the outer perimeter of the loop includes at least one un-insulated section.

7. The linear capacitor of claim 5, wherein at least one of the first and second dielectric materials comprising a plurality of layers secured together by compression.

8. The linear capacitor of claim 5, wherein the electric conducting material and at least one of the first and second dielectric materials are secured together by compression.

* * * * *